US009430884B2

(12) United States Patent
Drew et al.

(10) Patent No.: US 9,430,884 B2
(45) Date of Patent: Aug. 30, 2016

(54) VEHICLE COMMUNICATION AND CABLE TESTER SYSTEM

(71) Applicant: Drew Technologies, Inc., Ann Arbor, MI (US)

(72) Inventors: Michael Drew, Dexter, MI (US); Brian Herron, Dexter, MI (US)

(73) Assignee: DREW TECHNOLOGIES, INC., Ann Arbor, MI (US)

( * ) Notice: Subject to any disclaimer, the term of this patent is extended or adjusted under 35 U.S.C. 154(b) by 140 days.

(21) Appl. No.: 14/132,788

(22) Filed: Dec. 18, 2013

(65) Prior Publication Data

US 2014/0172230 A1 Jun. 19, 2014

Related U.S. Application Data

(60) Provisional application No. 61/738,552, filed on Dec. 18, 2012.

(51) Int. Cl.
*G07C 5/08* (2006.01)
*G01M 17/00* (2006.01)

(52) U.S. Cl.
CPC .................................... *G07C 5/08* (2013.01)

(58) Field of Classification Search
CPC G07C 5/008; G07C 5/0858; B60R 16/0231; G01D 3/08; H04L 43/50; G01M 17/00; G06F 11/2733; H01R 13/6273
USPC .................... 701/31.4, 31.5, 33.4, 102, 33.2; 324/537; 439/345
See application file for complete search history.

(56) References Cited

U.S. PATENT DOCUMENTS

| | | | | | |
|---|---|---|---|---|---|
| 5,563,788 | A * | 10/1996 | Yoon | B60R 16/0231 | 701/114 |
| 6,816,760 | B1 * | 11/2004 | Namaky | G06F 11/2733 | 701/33.2 |
| 2005/0182535 | A1 * | 8/2005 | Huang | H04L 43/50 | 701/31.4 |
| 2008/0033609 | A1 * | 2/2008 | Razavi | G01M 17/00 | 701/31.4 |
| 2009/0203247 | A1 * | 8/2009 | Fifelski | H01R 13/6273 | 439/345 |
| 2009/0299566 | A1 * | 12/2009 | Tanigawa | G07C 5/008 | 701/31.4 |
| 2010/0188098 | A1 * | 7/2010 | Fink | G01D 3/08 | 324/537 |
| 2012/0203441 | A1 * | 8/2012 | Higgins | G07C 5/0858 | 701/102 |

* cited by examiner

*Primary Examiner* — Yuri Kan
(74) *Attorney, Agent, or Firm* — Brinks Gilson & Lione

(57) ABSTRACT

A device includes a processor in communication with a first port, a second port and a third port. The first port is configured to communicate via a diagnostic cable with an electronic control unit of a vehicle. The diagnostic able cable has a first end configured to connect to a vehicle port and a second end configured to connect to the first port. The processor is configured to selectively test the communication capability of the diagnostic cable when the first end of the diagnostic cable is connected to the third port and the second end of the diagnostic cable is connected to the first port.

11 Claims, 2 Drawing Sheets

VEHICLE COMMUNICATION AND CABLE TESTER SYSTEM

CROSS REFERENCE TO RELATED PATENT APPLICATION

This application claims priority to U.S. Provisional Patent Application 61/738,552, filed on Dec. 18, 2012, which is hereby incorporated by reference in its entirety.

BACKGROUND

1. Field of the Invention

The present invention generally relates vehicle emissions interfaces.

2. Description of Related Art

From 1996-present, vehicles have onboard diagnostics which allow technicians and emissions test stations to evaluate the vehicle's condition. The vehicle's ECU was designed from the factory to continuously test its own emissions and only set the emissions monitors to "ready" once those tests have successfully completed. If the tests are not completed, or if they have failed, the monitor status is reported as "not ready".

When vehicles are brought in for state emissions, they are tested by a state-authorized facility that plugs a scantool into the car's OBD-II port. The scantool checks the ECU to see if any trouble codes are present, and if all of the vehicle's emission monitors have passed. If all of the monitors have passed and no trouble codes are present, the vehicle passes the states emissions test. If any trouble codes are present or if any of the monitors have not completed their tests, the vehicle fails the state emissions test. In many states, this emissions test is required for annual or bi-annual registration.

However, emissions testing places the testing equipment used to determine if the vehicle has passed emissions under great stress. For example, the diagnostic cable that connects the vehicle to the emissions testing device must be plugged and unplugged into the vehicle's OBD-II port every time an emissions test occurs. Due to the volume of the number of vehicles subject to these emissions testing procedures, the diagnostic cable can quickly reach the end of its useful life. More problematic is the fact that testing the diagnostic cable to make sure that the diagnostic cable is functioning properly can be difficult, as most facilities where emissions testing occur do not usually have the appropriate equipment to test the diagnostic cable.

SUMMARY

A device includes a processor in communication with a first port, a second port and a third port. The first port is configured to communicate via a diagnostic cable with an electronic control unit (ECU) of a vehicle. The diagnostic able cable has a first end configured to connect to a vehicle port and a second end configured to connect to the first port. The processor is configured to selectively test the communication capability of the diagnostic cable when the first end of the diagnostic cable is connected to the third port and the second end of the diagnostic cable is connected to the first port.

Further objects, features and advantages of this invention will become readily apparent to persons skilled in the art after a review of the following description, with reference to the drawings and claims that are appended to and form a part of this specification.

DETAILED DESCRIPTION

Figure 1:
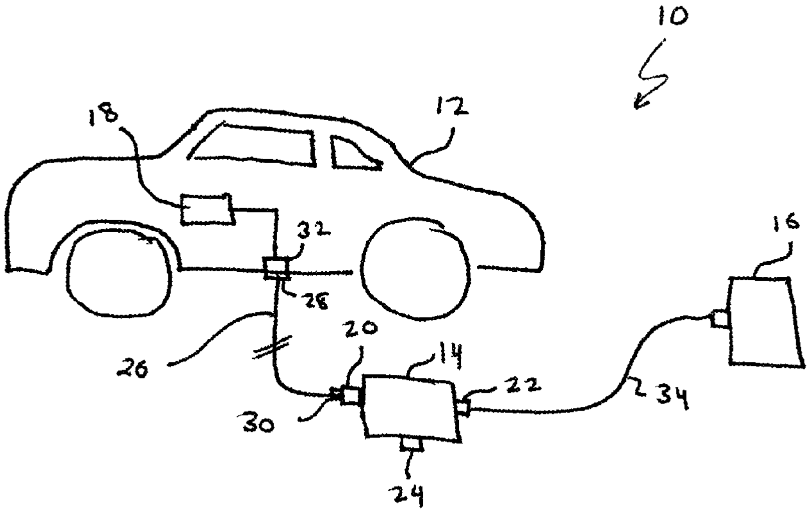
FIG. 1 illustrates a vehicle communication and cable tester device connected to an automobile and an emissions testing device.

Referring now to FIG. 1, a system includes a vehicle 12, a vehicle communication device 14, and an emissions testing device 16. The vehicle 12 includes an electronic control unit (ECU) 18. It should be understood that the vehicle 12 may be any one of a number of different vehicles. For example, the vehicle 12 may be a common passenger car or a light truck, but may also be other wheeled vehicles such as heavy duty commercial trucks, recreational vehicles, farm equipment, or the like. Additionally, the vehicle 12 may also be a non-wheeled vehicle, such as military equipment, airplane, or boat.

The ECU 18 of the vehicle 12 may be one or more processors located within the vehicle 12. The ECU 18 may be responsible for a number of different functions for the vehicle 12. For example, the ECU 18 may be related to emissions of a vehicle 12 but also may be related to other areas such as engine control, power train, safety systems, body control modules, or any other system requiring an ECU located within the vehicle 12.

The device 14, which will be explained in much greater detail in FIG. 2, includes a first port 20, a second port 22, and a third port 24. A diagnostic cable 26 has a first end 28 and a second end 30. The first end 28 of the diagnostic cable 26 is connected to a port 32 which is in communication with the ECU 18 of the vehicle 12. The port 32 may be any one of a number of different ports, but may be an OBD-II port commonly found on automobiles sold in North America. The second end 30 of the diagnostic cable 26 is connected to the first port 20.

A cable 34 is connected between the second port 22 and the emissions testing device 16. The second cable 34 may be any one of a number of different cables, such as USB or any other suitable parallel or serial communication cable. When connected as described above, the device 14 acts as a conduit between the ECU 18 of the vehicle 12 and the emissions testing device 16. Essentially, the device 14 acts as a translator between the ECU 18 and the emissions testing device 16. Examples of such devices can include Society of Automotive Engineer ("SAE") J2534 devices which essentially act as a pass through devices translating information between the ECU 18 of the vehicle 12 and a secondary device, such as the emission testing device 16.

Figure 2:
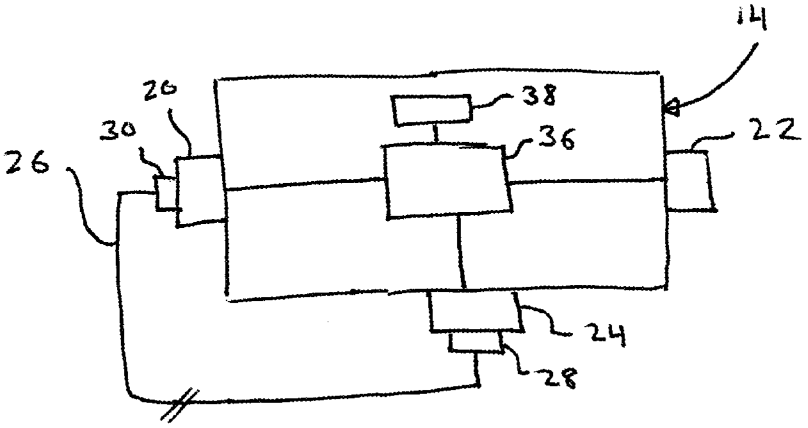
FIG. 2 illustrates the vehicle communications and cable tester device of FIG. 1 in greater detail.

Referring to FIG. 2, a more detailed illustration of the device 14 is shown. As stated previously, the device 14 includes a first port 20, a second port 22 and a third port 24. The device 14 also includes a processor 36 in communication with the first port 20, the second port 22, and the third port 24. The device 14 may also include a memory storage unit 38.

The memory storage unit 38 may be any one of a number of different memory storage units and should not be limited to simply solid state memory, magnetic memory, or optical memories. The memory storage device 38 is in communication with the processor 36 and may store data generated or received by the processor 36 and may also include instructions for configuring the processor 36 to perform any one of a number of different tasks. Of course, the memory 38 may also be incorporated within the processor 36.

Also shown in FIG. 2 is the diagnostic cable 26. Here, the diagnostic cable 26 has its first end 28 connected to the third port 24 and its second end 30 connected to the first port 20. Essentially, the diagnostic cable is connected to the device 14 at two locations—the first port 20 and the third port 24.

When the diagnostic cable 26 is connected as shown in FIG. 2, the processor 36 can be instructed to perform testing of the cable 26. For example, the processor 36 can send a known signal from the first port 20 to the third port 24 via the diagnostic cable 26. If the signal received by the third port 24 is not the same or similar as the signal sent from the first port 20, the processor 36 can determine that the cable 26 is not operating properly. Additionally, the processor 26 may be configured to perform continuity testing of the cable 26 as well.

Essentially, the device 14 allows the rapid testing of the cable 26 in situations where the cable 26 may not be operating properly. By so doing, this has a significant advantage of allowing the cable 26 to be quickly tested on the spot without having to use complicated signal testing equipment or utilize to determine if the first cable is operating properly.

Figure 3:
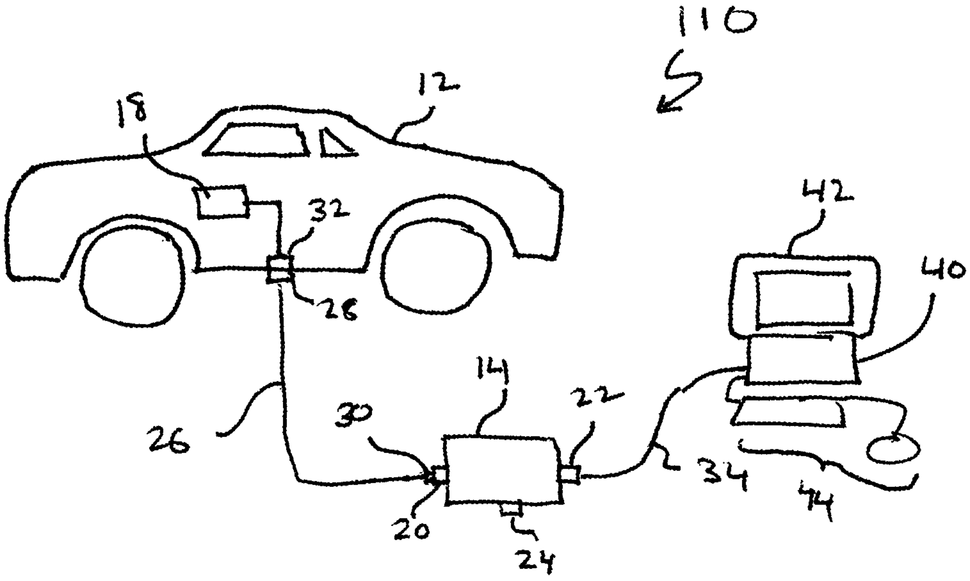
FIG. 3 illustrates the vehicle communication and cable tester device connected to an automobile and a general purpose computer.

As stated previously in FIG. 1, the emissions testing device 16 may be a single purpose emissions testing device commonly found at state testing facilities in states where emission testing is required. However, the emissions testing device 16 may take a variety of different forms. For example, in FIG. 3, the system 110 is shown. In FIG. 3 like numerals will be utilized to describe like elements of those of FIG. 1. A description of these elements will not be given again.

In this embodiment, the second port 22 of the device 14 is connected to a general purpose computer 40. The general purpose computer 40 may include an output device 42, such as a monitor and an input device 44, such as a keyboard and/or mouse. Of course, any one of a number of different input devices or output devices may be connected to the general purpose computer 40.

In this embodiment, the general purpose computer 40 would be provided with emissions testing software to test the emissions of the vehicle 12 by communicating with the ECU 18 of the vehicle 12 via the device 14. As described before, the device 14 essentially acts as the translator for allowing communication between the ECU 18 and the computer 40, while also having the additional benefit of being able to test the cable 26 by simply connecting a first end 28 of the cable 26 to the third port 24 and a second and 30 of the cable 26 to the first port 20.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

The invention claimed is:

1. An vehicle communication device, the vehicle communication device being separate from the vehicle, the device comprising:

a processor in communication with a first port, a second port and a third port;

the first port being configured to communicate via a removable diagnostic cable with an electronic control unit of a vehicle and a third port of the device, the removable diagnostic cable having a first end configured to removably connect to a vehicle port, the vehicle port being in communication with the electronic control unit of the vehicle, the cable having a second end configured to connect to the first port;

the second port configured to communicate with an auxiliary device;

the third port configured to manually and removably connect to the first end of the removable diagnostic cable;

wherein the processor is configured to selectively test the communication capability of the removable diagnostic cable when the first end of the removable diagnostic cable is manually connected to the third port and the second end of the diagnostic cable is connected to the first port; and wherein the processor is configured to communicate via the removable diagnostic cable with the electronic control unit of the vehicle when the first end of the diagnostic cable is manually connected to the vehicle port.

2. The device of claim 1, wherein the third port is a female connector.

3. The device of claim 1, wherein the third port is a female OBD-II connector.

4. The device of claim 1, wherein the first port is in communication with the third port.

5. The device of claim 1, wherein the auxiliary device comprises an external tester.

6. The device of claim 1, wherein the auxiliary device comprises a computing device.

7. The device of claim 6, wherein the processor is configured to translate a first communication language of the vehicle to a second communication language configured for being received by the computing device.

8. The device of claim 6, wherein the computing device comprises an emissions testing device.

9. The device of claim 1, wherein the second output port comprises an Ethernet or USB port and the first output port comprises an OBD-II connector.

10. The device of claim 1, wherein the processor is further configured to:

send a known signal from the first port to the third port when the first end of the removable diagnostic cable is connected to the third port and the second end of the diagnostic cable is connected to the first port;

determine that the removable diagnostic cable is defective if the known signal is not received by the third port from the first port.

11. The device of claim 1, wherein the processor is further configured to perform a continuity test of the removable diagnostic cable when the first end of the removable diagnostic cable is connected to the third port and the second end of the removable diagnostic cable is connected to the first port.

* * * * *